A. ROSENTHAL.
NUT HUSKING MACHINE.
APPLICATION FILED SEPT. 25, 1918.
1,297,497.
Patented Mar. 18, 1919.
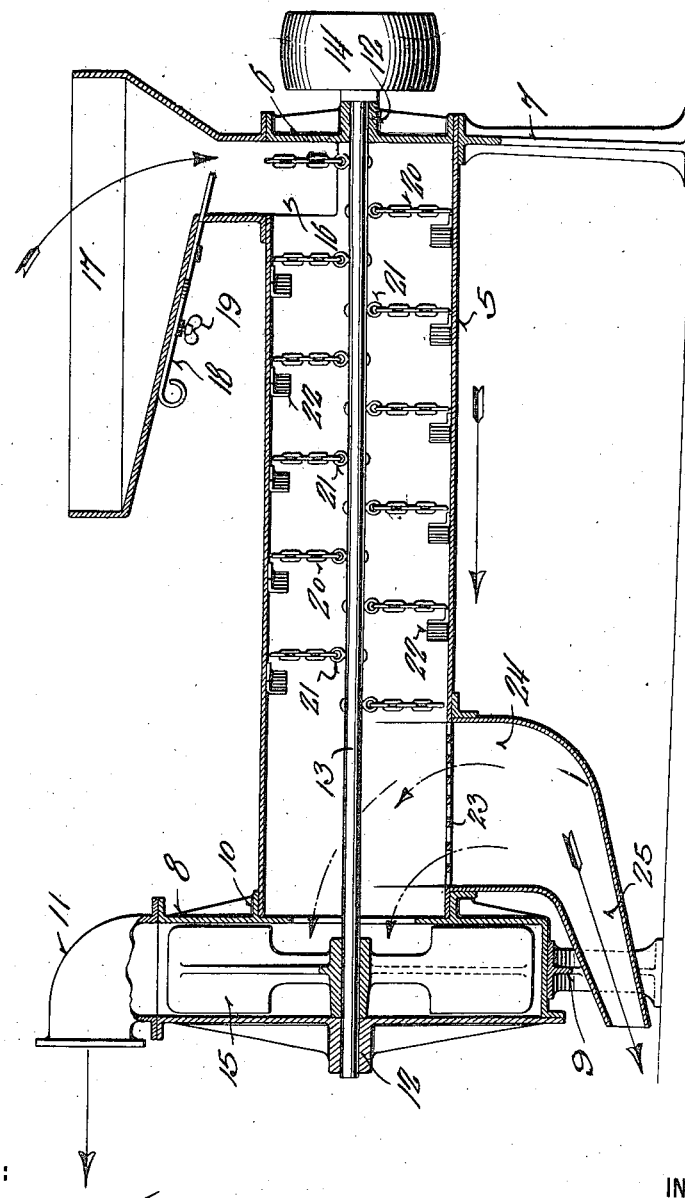

UNITED STATES PATENT OFFICE.

AUGUST ROSENTHAL, OF WEST ALLIS, WISCONSIN.

NUT-HUSKING MACHINE.

1,297,497. Specification of Letters Patent. Patented Mar. 18, 1919.

Application filed September 25, 1918. Serial No. 255,649.

*To all whom it may concern:*

Be it known that I, AUGUST ROSENTHAL, a citizen of the United States, and resident of West Allis, in the county of Milwaukee and State of Wisconsin, have invented certain new and useful Improvements in Nut-Husking Machines; and I do hereby declare that the following is a full, clear, and exact description thereof.

My invention relates to new and useful improvements in machines for husking nuts, and more particularly of that type adapted to effect a continuous grinding operation of the husks, and to discharge the husks and nuts at separate points.

It is in general the object of my invention to simplify and otherwise improve the structure and to increase the efficiency of machines of this character, particularly with respect to the husking operation on nuts of that general type having a husk about the shell.

A further object resides in the provision of a machine for husking nuts of that type wherein the nut by reason of its oil bearing qualities is very heavy in nature, and wherein the relative weight of the nuts is utilized in separating the nuts from the broken husks.

With these and other objects in view, which will be apparent as the description proceeds my invention resides in the novel features of construction, combination and arrangements of parts as hereinafter described and defined by the appended claims, it being understood that changes in the precise embodiment might be made by those skilled in the art without departing from the spirit of the invention.

In the accompanying drawing, there is shown a vertical longitudinal sectional view through a nut husking machine embodying my invention.

Referring now more particularly to the accompanying drawings, my machine includes a cylindrical elongated concave 5, one end of which is closed by a head plate 6 and supported on a suitable standard 7. The concave cylinder inclines downwardly at a very slight angle from this end thereof, and secured on the other lower end of the concave is a fan casing 8, supported by suitable legs 9, the securement of the fan casing to the concave cylinder being effected by engagement of the concave cylinder end in a laterally projecting annular flange 10 on the inner wall of the casing surrounding the intake port of the casing. The casing is provided with the usual peripheral discharge duct 11.

Journaled in bearings 12 formed on the outer fan casing wall and on the head plate 6 is a shaft 13 extending longitudinally through the concave cylinder and carrying on one end a drive pulley 14. A fan 15 is fixed on the shaft within the fan casing.

Nuts are fed through an opening 16 in the upper end of the concave from a hopper 17 whose discharge neck is secured over the opening, a regulation of the feed of nuts being procured by a plate 18 slidably mounted on the under face of the hopper and projecting across the discharge neck of the hopper, this plate being adjustably held by the set screw 19.

For grinding the nut husks within the concave, a series of beater chain lengths 20 are provided which are secured on eye-bolts 21 passed through the shaft 13 and disposed in spaced relation therealong through a major portion of its length from its forward or upper end, the lengths of these beater chain sections being such that their outer ends extend approximately to the wall of the concave cylinder. Secured on the inner periphery of the concave cylinder are angle iron rib plates 22, each having one side secured to the concave wall with its other side extending inwardly and disposed obliquely with respect to the axis of the concave cylinder, it being noted that these ribs are disposed between the rotative paths of the chain sections, and that the chain sections are spaced apart in such manner in connection with the oblique extension of the ribs 22, that upon a driving rotation of the shaft, nuts in the concave will be thrown by the chain sections against the ribs to insure detachment of the husks.

To procure discharge of husked nuts from the concave, the bottom thereof adjacent the fan is provided with a discharge opening, over which is disposed a grid 23 having its openings of such size to permit discharge of the nuts therethrough, and depending from this grid is a receiving boot 24 terminating in a discharge spout 25 extending rearwardly under the fan casing.

An exceedingly simple and efficient machine has thus been provided for husking and separating the detached husks and nuts. In operation. nuts are dumped into the hopper 17 and a regular feed of the nuts into the concave is adjustably procured by the plate 18. As the nuts fall into the concave, they are engaged by the beater chain sections and thrown against the ribs 22, passing from the forward to the rear end of the concave cylinder by reason of the downward inclination thereof, and by reason of the beating action set up in connection with the chain sections and ribs 22. As the mass of nuts and detached husks reaches the grid 23, the nuts will fall therethrough, while the broken husks will be taken up in the blast of air set up by the fan 15 and conveyed through the fan and discharged through the duct 11 thereof to a suitable dumping point. Inasmuch as the air current of the fan passes through the boot 24 and grid 23, a most efficient separating action is set up.

While I have shown and described a preferred embodiment of my invention, it will be understood that various changes and modifications of structure, to meet differing conditions of use, may be employed in any manner without departing from the spirit of my invention. For instance, the ribs formed by the angle iron rib plates 22 may be formed in any other suitable manner, and may, if desired, be integral with the concave wall.

I claim:

1. A nut husking machine including a cylindrical imperforate concave, means for feeding nuts into one end portion of the concave, beater members in the concave, the bottom of the other end portion of the concave being provided with a discharge opening, a fan casing communicating with and closing said other end portion of the concave and a fan in the casing for conveying broken husks from the concave through said fan casing.

2. A nut husking machine including a cylindrical imperforate concave, means for feeding nuts into one end portion of the concave, beater members in the concave, the bottom of the other end portion of the concave being provided with a discharge opening, a grid disposed over said opening and provided with apertures of sufficient size to permit the passage of nuts therethrough, a fan casing communicating with and closing said other end portion of the concave and a fan in the casing for conveying detached husks from the concave through said fan casing.

3. A nut husking machine including an elongated inclined imperforate concave cylinder, a head plate closing one end of the cylinder, a fan casing secured on and closing the other end of the cylinder, a shaft extended longitudinally through the cylinder and journaled in the head plate and fan casing, beater members carried on said shaft within the cylinder, a fan on the shaft within the fan casing, means for feeding nuts into the upper end portion of the concave cylinder, and said concave cylinder being provided with a discharge opening in the bottom of its lower end portion for permitting discharge of nuts from the cylinder and for permitting inflow of air for conveying husks from the cylinder through the fan.

4. A nut husking machine including a cylindrical concave, a shaft extending axially through said concave, projections on the inner periphery of the concave, and beater chain sections carried by the shaft.

5. A nut husking machine including a cylindrical concave, beater ribs on the inner periphery of the concave inclined obliquely with respect to the axis thereof, a shaft disposed axially in the concave, and beater members carried by said shaft, the said ribs being disposed between the paths of rotation of the beater members.

In testimony that I claim the foregoing I have hereunto set my hand at Milwaukee, in the county of Milwaukee and State of Wisconsin.

AUGUST ROSENTHAL.